United States Patent
Jaquette (10) Patent No.: US 8,068,303 B2
(45) Date of Patent: Nov. 29, 2011

(54) LATERAL PARTITIONING FOR A SHINGLED TAPE FORMAT

(75) Inventor: Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 12/695,012

(22) Filed: Jan. 27, 2010

(65) Prior Publication Data

US 2010/0265612 A1 Oct. 21, 2010

Related U.S. Application Data (60) Provisional application No. 61/170,515, filed on Apr. 17, 2009.

(51) Int. Cl.
G11B 5/09 (2006.01)
G11B 5/02 (2006.01)
G11B 5/584 (2006.01)

(52) U.S. Cl. ....... 360/48; 360/22; 360/77.12; 360/77.13

(58) Field of Classification Search ................ None
See application file for complete search history.

(56) References Cited

U.S. PATENT DOCUMENTS

2004/0174628 A1* 9/2004 Schwarz et al. ............. 360/48
2007/0242380 A1* 10/2007 Fukuda et al. ............. 360/48

* cited by examiner

*Primary Examiner* — Andrew L Sniezek
(74) *Attorney, Agent, or Firm* — Griffiths & Seaton PLLC (57) ABSTRACT

Various embodiments for writing data in a tape medium having wraps by a tape drive are provided. The tape drive allocates the wraps in a shingled data band between two or more data partitions. A set of contiguous wraps is allocated to one data partition of the two or more data partitions. An additional set of contiguous wraps is allocated to an additional data partition of the two or more data partitions. A minimum buffer is retained between the set and the additional set of contiguous wraps of at least one wrap per direction written within at least one data band shared between the one and the additional data partitions such that the one and the additional data partitions may be written to by the tape drive independently of each other.

25 Claims, 9 Drawing Sheets

FIG. 1

| # OF PARTITIONS | SIZE OF 2ND PARTITION | PARTITION 0 | PARTITION 1 | SHINGLE BUFFER ( NOT USED FOR DATA) |
|---|---|---|---|---|
| 1 | 0 | WRAPS 0 - 55 | N/A | N/A |
| 2 | 1/28 = 3.6% | WRAPS 0-41, THEN WRAPS 46-55 = 52 | 2 WRAPS = WRAPS 42 & 43 | 2 WRAPS (3.6%) = WRAPS 44 & 45 |
| 2 | 1/14 = 7.1% | WRAPS 0-41, THEN WRAPS 48-55 = 50 | 4 WRAPS = WRAPS 42 - 45 | 2 WRAPS (3.6%) = WRAPS 46 & 47 |
| 2 | 3/28 = 10.7% | WRAPS 0-41, THEN WRAPS 50-55 = 48 | 6 WRAPS = WRAPS 42 - 47 | 2 WRAPS (3.6%) = WRAPS 48 & 49 |
| 2 | 2/14 = 14.3% | WRAPS 0-41, THEN WRAPS 52-55 = 46 | 8 WRAPS = WRAPS 42 - 49 | 2 WRAPS (3.6%) = WRAPS 50 & 51 |
| 2 | 5/28 = 17.9% | WRAPS 0-41, THEN WRAPS 54-55 = 44 | 10 WRAPS = WRAPS 42 - 51 | 2 WRAPS (3.6%) = WRAPS 52 & 53 |
| 2 | 3/14 = 21.4% | WRAPS 0-41 = 42 | 12 WRAPS = WRAPS 42 - 53 | NO BUFFER NEEDED |
| 2 | 1/4 = 25% | WRAPS 0-41 = 42 | 14 WRAPS = WRAPS 42 - 55 | N/A |
| 2 | 2/7 = 28.6% | WRAPS 0-27, THEN WRAPS 32-41 | 16 WRAPS = WRAPS 42 - 55, THEN WRAPS 28 & 29 | 2 WRAPS (3.6%) = WRAPS 30 & 31 |

| PARTITIONING METHOD | HOUSEKEEPING DATASETS | SYMM. LONGITUDINAL | ASYMM. LONGITUDINAL | LATERAL PER INVENTION | LATERAL @ DB BOUNDARIES |
|---|---|---|---|---|---|
| INDEPENDENTLY UPDATEABLE | YES | YES | YES | YES | YES |
| PHyDis LP3 TO PART. 0 | ZERO (@ LP3) | LENGTH OF PART. 1 | COULD BE ZERO (@ LP3) | ZERO (@ LP3) | ZERO (@ LP3) |
| PHyDis LP3 TO PART. 1 | pre-BOT @ LP2 | ZERO (@ LP3) | COULD BE ZERO (@ LP3) | ZERO (@ LP3) | ZERO (@ LP3) |
| RANGE OF PART. 1 SIZE | ~4 GB IN LTO-5 = ~3% | 0% TO 98 % | 0% TO 97 % | 0%, 3.6%, ... 92.9% | 0%, 25%, 50%, 75% |
| GRANULARITY OF PART. 1 SIZE | ~3% | COULD BE VERY FINE < 1% | COULD BE VERY FINE < 1% | 3.6% | |
| WRAP TURNS TO READ PART. 1 | 28 | 56 | 52 | 2 (FOR MIN. SIZE PART. 1) | 14 (FOR MIN. SIZE PART. 1) |
| WRAP TURN OH (2 SEC PER) | 56 s | 112 s | 104 s | 4 s | 28 s |
| CAN CHANGE SIZE PART. 1? | CANNOT INCREASE EVER | NO | NO | YES (@ 3.6% INCR.) | YES (@ 25% INCR.) |
| USER CAPACITY LOST | 0% | ~2% | ~3% | 3.6% TYP, 0% @ DB BNDY | 0% |

LATERAL PARTITIONING FOR A SHINGLED TAPE FORMAT

CROSS-REFERENCE TO RELATED APPLICATIONS

This application claims the benefit of U.S. Provisional Application No. 61/170,515, filed Apr. 17, 2009.

BACKGROUND OF THE INVENTION

1. Field of the Invention

The present invention relates in general to computers, and more particularly to a method, system, and computer program product for lateral partitioning for a shingled tape format.

2. Description of the Related Art

Three prevalent tape storage technologies include a helical scan tape where data is stored along vertical or diagonal tracks on the tape, parallel tape where data is stored on longitudinal tracks in parallel during one scan on the tape, and serpentine tape where data is written in a forward and then reverse longitudinal direction in a serpentine pattern across bands or tracks on the magnetic tape medium. In serpentine tape drives, the bands extending the length of the tape may be divided longitudinally into segments, such as a housekeeping segment, calibration segment, user data segment, etc., where data is written in a serpentine manner within the bands of a longitudinal segment. A serpentine tape drive first read/writes a set of tracks in a forward direction within a segment of a band, referred to as a wrap, then read/writes the next set of tracks in a reverse direction, and so on, leading to a serpentine pattern for the data layout. In serpentine tape technology, a wrap comprises a set of tracks written for some length of one of the bands that extend the entire length of the tape and a wrap section comprises a wrap for the length of one segment.

SUMMARY OF THE INVENTION

Partitioning tape creates separate, logically addressable storage entities on the tape that can be written to independently. While some techniques for partitioning tape in certain scenarios have been developed, a technique for partitioning tape in conjunction with a "shingling" write technique have not yet been introduced. In such a shingled write, the write track (or wrap) may overlap the "bottom" of a previously written track. In a spiral-in format, a "bottom" when writing in one direction is toward one lateral edge of the tape. The bottom when writing in an opposing direction is toward the other lateral edge of the tape.

Shingling of write data allows for the writing of multiple tape formats. For example, a Linear Tape Open (LTO)-2 drive can write to an LTO-1 format because the write head is the width of an LTO-1 track. When writing the LTO-1 format, LTO-2 drives do not shingle. The same head, however, may be used to write the LTO-2 format, which has a finer track pitch, using shingled writing. Because a mechanism for performing partitioning in conjunction with shingled tape formats is not available, a need exists for such a technique. In addition, a need exists for mechanisms for dynamically performing such partitioning in order to adaptively manage partitioning space to the extent where as much tape space capacity as possible is utilized.

Accordingly, the present invention provides exemplary method, system, and computer program product embodiments allowing for partitioning, such as lateral partitioning, to be performed on a write-shingled tape format with minimal loss of tape capacity, while allowing each partition to grow until the sum of the partitions, plus the necessary buffer between the partitions, consumes all available tape space. In one such embodiment, by way of example only, a method for writing data in a tape medium having wraps by a tape drive is provided. The tape drive allocates the wraps in a shingled data band between two or more data partitions. A set of contiguous wraps is allocated to one data partition of the two or more data partitions. An additional set of contiguous wraps is allocated to an additional data partition of the two or more data partitions. A minimum buffer is retained between the set and the additional set of contiguous wraps of at least one wrap per direction written within at least one data band shared between the one and the additional data partitions such that the one and the additional data partitions may be written to by the tape drive independently of each other.

Related method, system, and computer program product embodiments are provided and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, the illustrated embodiments depict and describe various techniques for providing a tape format allowing for partitioning, such as lateral partitioning, to be performed on a write-shingled tape format with minimal loss of tape capacity, while allowing each partition to grow until the sum of the partitions, plus the necessary buffer between the partitions, consumes all available tape space. In some embodiments, the partitioning occurs dynamically pursuant to determinations of necessities of space for a particular partition. The illustrated embodiments take advantage of each data band within the tape space by using at least a minimal amount of buffer wraps between partitions in cases where expansion of a particular partition is required beyond the confines of a single data band. The buffer wraps for a certain data band may be selectively chosen depending on these determinations as will be further described in various scenarios.

Figure 1:
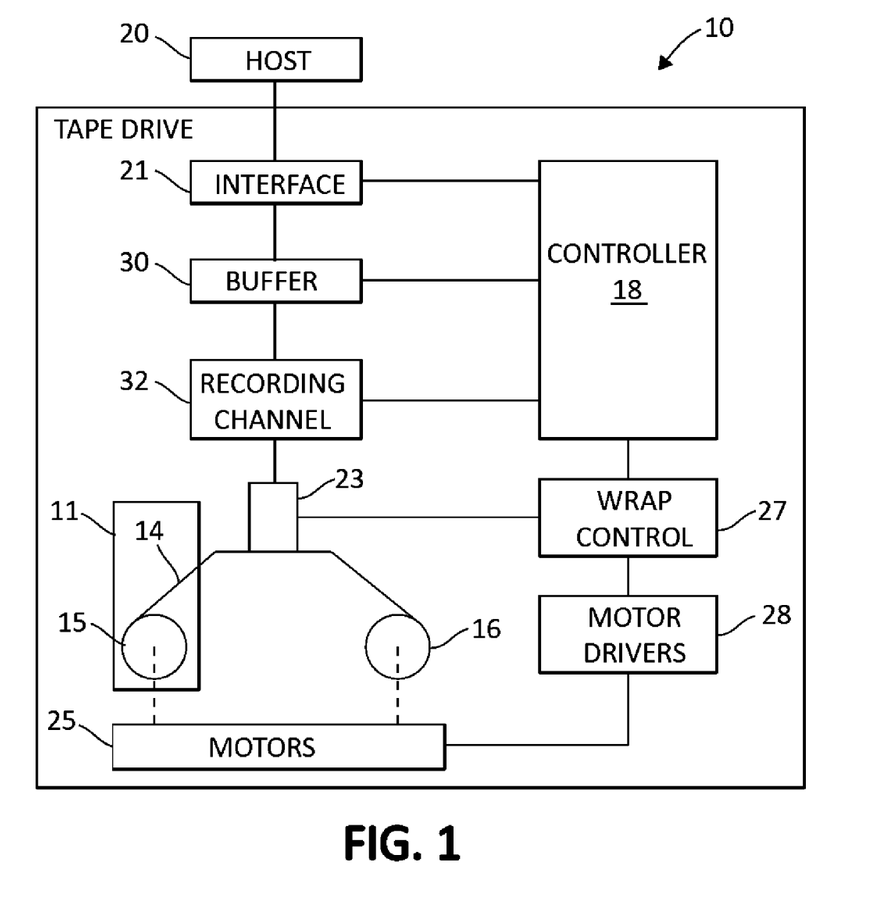
FIG. 1 is a block diagram of an exemplary magnetic tape drive with a magnetic tape cartridge capable of implementing various aspects of the present invention.

Referring to FIG. 1, a tape drive 10 is illustrated which may implement aspects of the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM® 3580 Ultrium® magnetic tape drive based on LTO technology. Another example of a single reel tape drive is the IBM® 3590 Magstar® magnetic tape drive and associated magnetic tape cartridge. An example of a dual reel cartridge is the IBM® 3570 magnetic tape cartridge and associated drive.

As is understood by those of skill in the art, a magnetic tape cartridge 11 comprises a length of magnetic tape 14 wound on one or two reels 15, 16. Also as is understood by those of skill in the art, a tape drive 10 comprises one or more controllers 18 of a recording system for operating the tape drive in accordance with commands received from a host system 20 received at an interface 21. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel Interface, etc.

The magnetic tape cartridge 11 may be inserted in the tape drive 10, and loaded by the tape drive so that one or more read and/or write heads 23 of the recording system reads and/or writes information with respect to the magnetic tape 14 as the tape is moved longitudinally by one or more motors 25. The magnetic tape comprises a plurality of parallel tracks, or groups of tracks. In some formats, such as the LTO format, discussed above, the tracks are arranged in a serpentine back and forth pattern of separate wraps, as is known to those of skill in the art. Also as known to those of skill in the art, the recording system comprises a wrap control system 27 to electronically switch to another set of read and/or write heads, and/or to seek and move the read and/or write heads 23 laterally relative to the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18. Controller 18 also provides the data flow and formatting of data to be read from and written to the magnetic tape, employing a buffer 30 and a recording channel 32, as is known to those of skill in the art.

As discussed above, magnetic tape provides a means for physically storing data that may be archived or that may be stored in storage shelves of automated data storage libraries and accessed when required. Tape drives often employ a "read after write" process to insure that the data is written correctly to provide an aspect of permanence. This permanence allows copies of the data stored in memory or disk at the host system 20 to be erased, knowing that a correct copy exists on magnetic tape.

In one embodiment, drive 10 writes data according to an LTO-4 format using so-called "spiral-in shingling," a technique known to the skilled artisan. Such spiral-in shingling is designed to be stream written from start (first track of spiral) to end (last track of spiral). In the illustrated embodiments, various depictions of portions of tape are provided. Many of these depictions illustrate one or two data bands for the sake of convenience. However, the skilled artisan will appreciate that the implementation of additional data bands are contemplated such as four data bands pursuant to the LTO-4 format. As linear tape formats become more sophisticated, the use of additional numbers of data bands, such as eight or sixteen data bands are also contemplated herein.

In the illustrated embodiments, techniques for dynamic lateral partitioning are described in shingled write formats such as LTO-4. When the dynamic lateral partitioning commences, each partition is started at the beginning of a differing data band, with each partition spiraling within that particular data band. Each partition may expand autonomously from the other until a given partition is filled. When a partition has filled a data band, the partition can be expanded further by allocating additional wraps, or wrap pairs, from another data band as will be further illustrated, following. In one embodiment, space is allocated in a final data band once. For example, consider that a Partition X uses certain wrap pairs in a data band Z (the last data band with free space), when Partition Y needs to expand by adding wrap pairs. A determination is made first as to how many other wrap pairs are needed by Partition X and allocated. As a next step, a wrap pair is added as a buffer as will be further described. Finally, the remaining wrap pairs are allocated to Partition Y. In this way, the final data band is broken once into three portions (e.g., wraps allocated to Partition X, a buffer portion, and wraps allocated to Partition Y).

To further explain the forgoing example, consider a scenario where between Partition X and Partition Y, all data bands have been accounted for except one, which is presently unallocated. Partition X is written to the point that all of its presently allocated wraps are full and it must now expand into the last free data band, i.e. data band Z. In this scenario, a preferred assignment is to then begin writing Partition X at the start of the spiraling in shingled serpentine, which is to say that Partition X could potentially grow to encompass all of data band Z. At some point, writing resumes in Partition Y, and it too exceeds all of its presently allocated wraps are full and so it too must now expand into data band Z. It is at this point that the separation of Data Band Z wraps between Partition X and Y must be made, because where the writing Partition Y begins determines the separation of wraps between Partition X and Y. More specifically, the division of wraps in the final data band does occur just once, but the point at which that decision must be made is not when the first partition spans into the final data band, but when the second partition does, because it is at that point that a decision must be made as how to allocate the wraps in that final data band. Some of those wraps have already been consumed by the first partition to grow into that data band; the only decision that needs to be made is how to allocate the as yet unwritten wraps in the final data band.

When a serpentine always traverses wraps in a given order (e.g. as is the case in all LTO formats with a single partition), there is no question as to wrap order to progress in. Similarly, if Partition 0 is always started at a given wrap (e.g., the first wrap in Data Band 0), and Partition 1 is always started at a different given wrap (e.g., the first wrap in Data Band 3), then each partition has a given starting point. If the wrap order will always then progress in some fixed order until the End of Data (EOD) dataset, or the End of Partition (EOP) dataset is found, then a known way exists to proceed through each partition's serpentine without any explicit wrap map (i.e., a recorded table) delineating which wraps to traverse in what order. If however, the wrap order to progress in is in any way uncertain for either or both partitions, then for all practical purposes it may be desirable for a certain amount of information to be recorded in order for the tape drive to determine which wrap to proceed when the drive reaches the end of a particular wrap. Such recorded information may again be stored in a recorded table in a variety of locations (tape or elsewhere) known to the skilled artisan.

Figure 2:
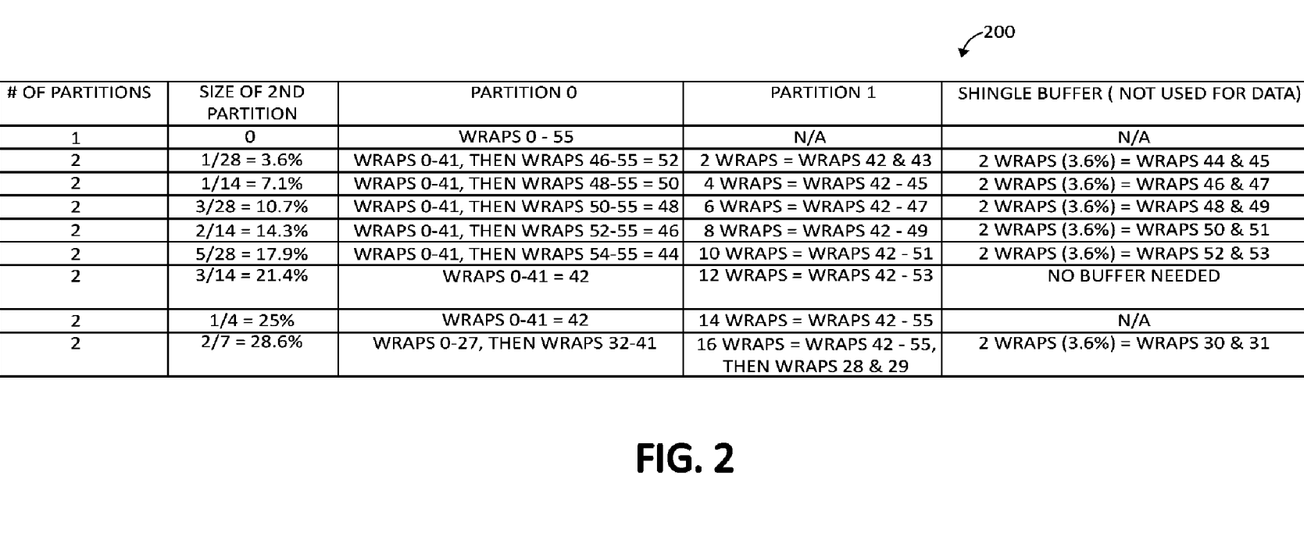
FIG. 2 is a table of exemplary wrap assignments for a two-partition tape format, with the sum of the two partitions consuming all available tape capacity.

Turning to FIG. 2, a table 200 of exemplary wrap assignments of a two-partition, 56-wrap LTO-4 format is depicted. In the LTO-4 format, wraps 0-13 are in Data Band 0 (DB0), 14-27 in Data Band 1 (DB1), 28-41 in Data Band 2 (DB2), and 42-55 in Data Band 3 (DB3). Within each data band, a shingling spiral in procedure is performed as will be further described, following. The outermost wraps within each data band are as follows. For DB0, wraps 0 and 1; for DB1, wraps 14 and 15; for DB2, wraps 28 and 29; and for DB3, wraps 42 and 43. It should be noted that even when wraps are evenly divided between an even number of data bands, it is at least theoretically possible that each data band has an odd number of wraps. For example, in the case of LTO and 4 data bands, if the format had 52 wraps total, each data band contains 13 wraps each. An odd number of wraps in a particular data band doesn't change the necessity of two buffer tracks to separate two partitions extending into the same data band.

Two wraps (in the depicted embodiment, approximately 3.6% of cartridge capacity) are reserved for buffer as is seen in the far right column. These buffers are implemented so that the two partitions are independently updateable, even when each partition is written with write shingling performed. In the case where a second partition is needed, a nominal amount of capacity may be assigned to the second partition (for example, approximately 3.6% in an LTO-4 format). However, a possibility exists that more data will be written to the second partition than had originally been planned. In that case, additional wraps may be added to make the second partition larger. Over time, progressively more wraps may be added to the second partition until the last data band is filled.

If two wraps are assigned at a time, given that the LTO-4 format includes 14 wraps per data band, eight possible increments for wraps assigned to the second partition are possible, including 0, 2, 4, 6, 8, 10, 12, or 14. In the case of 12 wraps used for partition 1 (wraps 42-53) as depicted, no buffers are needed, as the buffers would be placed adjacent to data band boundaries. As a result, data could be written to the final two wraps. Generically speaking, no buffer tracks are needed when it is possible to allocate an integer number of data bands to each partition. This is because the two partitions do not have to share any of the data bands and so write shingling within a data band is not an issue. Over time, the second partition may grow into the previous data band (DB2), as is shown in the bottom row of table 200.

Assignment of wraps to partitions may be performed in one of two ways. Either a fixed division of storage capacity may be made (i.e., the capacity is created at a given time and not later changed), or there is a flexible division of storage capacity (i.e., that may be easily changed over time, adaptively if needed). In the exemplary wrap assignment depicted in table 200, either of the two assignments may be performed.

Figure 3:
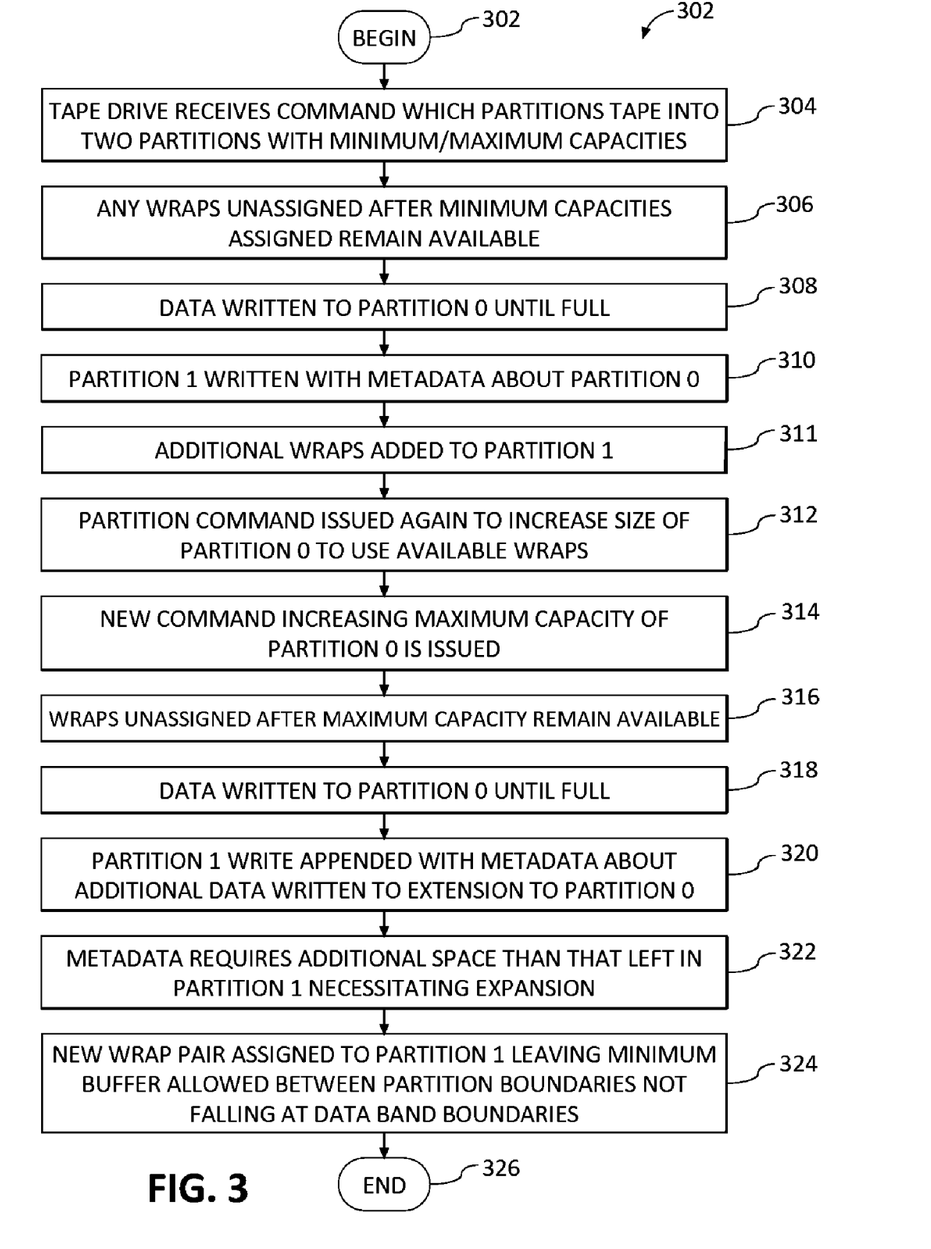
FIG. 3 is a flow chart diagram of exemplary adaptive steps for implementing a lateral, two-partition technique in a Linear Tape Open (LTO) format.

Turning to FIG. 3, an exemplary method 300 for adaptive assignment of wraps to a two-partition format is depicted to further illustrate wrap assignment. As one skilled in the art will appreciate, various steps in the method 300 may be implemented in differing ways to suit a particular application. In addition, the described methods may be implemented by various means, such as hardware, software, firmware, or a combination thereof operational on or otherwise associated with the magnetic tape drive. For example, the methods may be implemented, partially or wholly, as a computer program product including a computer-readable storage medium having computer-readable program code portions stored therein.

The computer-readable storage medium may include disk drives, flash memory, digital versatile disks (DVDs), compact disks (CDs), and other types of storage mediums. Some steps in the method 300 refer specifically to an exemplary data storage operation where a storage drive writes user data to one partition, and creates metadata about the way the user data is stored in another partition, as one of ordinary skill in the art will appreciate. In other embodiments pursuant to other exemplary data storage operations, these steps may not be utilized as will be further described, following.

Method 300 begins (step 302) with the tape drive receiving a command that partitions the tape into two partitions (Partition 0 and Partition 1) (step 304). The command is a new command that has been designed for this purpose. The command may allow specification of two parameters including a maximum capacity of the first partition as a percentage, and a minimum capacity of the second partition as a percentage. In one embodiment, the maximum percentage may be specified as 75%, allocating wraps 0-41 in the case of an LTO-4 format. Additionally, the minimum percentage may be specified as approximately 3.6%, allocating wraps 42 and 43 in the case of the LTO-4 format.

As a next step, any wraps unassigned after the minimums are granted remain available, so long as any necessary buffer is maintained between the partitions (step 306). In the case of LTO-4, the parameter percentage allocations above leave wraps 44-55 available. At most, two of these wraps will be required to maintain the necessary buffer between the partitions. Data is then written to Partition 0 until it is full (at approximately 75%) (step 308). As a next step, Partition 1 is written with metadata about Partition 0 (step 310). While Partition is written with metadata in the instant case, the skilled artisan will appreciate that other data may be written in additional embodiments. This may take significantly less space than the 3.6% made available as the minimum, or it might truly need more space than was originally allocated to record all the metadata. For example, it may be determined that six wraps of Partition 1 are needed to record all the metadata about 42 wraps of Partition 0. As a result, the initial allocation of Partition 1 space is four wraps short, but this can readily be accommodated. Either automatically (i.e., dynamically), or in response to a command, additional wraps are added to Partition 1 (step 311). Returning to the LTO-4 example, wrap pair 44 and 45 are added first, followed by wraps 46 and 47. As a result, Partition 1 is using approximately 10.7% of the tape capacity, with wraps 48-55 remaining unused, or approximately 14.3% of capacity.

As a next step, the partition command is again invoked to increase the size of Partition 0 to utilize some of the remaining available wraps (step 312). While an additional command is invoked in the illustrated embodiment, the skilled artisan will appreciate that in a scenario where automatic allocation (e.g., dynamic allocation) of additional wraps is performed, the use of an additional partition command is alleviated. In one embodiment, a query command may be issued by an owning application first. From this query command, the application may learn (again, returning to the LTO-4 example) that the present partitioning is approximately 75% assigned to Partition 0, and approximately 10.7% assigned to Partition 2, with approximately 14.3% available as remaining capacity. Determining that the present rate of metadata being written to Partition 1 is creating about ⅕ as much storage space as that written to Partition 0, the owning application may decide to add an additional amount of capacity to Partition 1. As a result, the application sends a new command increasing the maximum size of Partition 0 to approximately 82.2% of the total (step 314). This would cause additional assignments of wraps 52-55 to Partition 0, leaving wraps unassigned after the maximum capacity again available (step 316), which is in this case, wraps 48-51.

Data is written to Partition 0 until it is full (i.e., the four additional wraps are filled by write append) (step 318). Partition 1 is then write appended (e.g. with metadata about the additional data written to the extension to Partition 0 (i.e. the new 4 wraps)) (step 320). This may require more space than is left in Partition 1, causing a need to expand Partition 1 (step 322). If at least one additional wrap was required, a new wrap pair is assigned to Partition 1, which after such assignment leaves the minimum buffer allowed between partition boundaries not falling at data band boundaries (step 324). Returning to the LTO-4 example, wrap pair 48 and 49 are added. As a result, Partition 1 then is using 8 wraps, or approximately 14.2% of the tape capacity. At this point wraps 50 and 51 are still unused, but in this case, this is the minimum buffer allowed between partition boundaries not falling at data band boundaries. Accordingly, in total, all tape capacity is used: approximately 82.2% by Partition 0; 14.2% by Partition 1; and 3.6% used as buffer. Method 300 then ends (step 326).

Method 300 illustrates a specific embodiment of at least two aspects of the present invention. A first aspect relates to the ability of the illustrated embodiments to implement buffer wraps between partition information on a single data band. These buffer wraps allow for at least two partitions to perform shingled writes on a single data band. In addition to the foregoing aspect, an additional aspect is presented whereby the illustrated embodiments may selectively (in some cases, automatically) select areas of a particular data band that will serve to contain at least two partitions. For example, as noted above, as partition space is filled and additional space is necessitated, additional wraps are allocated for both extensions of the existing partition, and to serve as buffer. These determinations may be made dynamically as space on a particular partition necessitates expansion.

Note that as a rule, all attempted partition size changes, whether by command or automatically, are checked by the tape drive. No increase is allowed which would cause writing into the minimum buffer. In this case, the moment Partition 0 was extended into the last data band, two wraps were set aside as the minimum necessary inter-partition buffer. Accordingly, at least two of the four wraps left were essentially set aside. As previously described, which of the wraps that must be left as a buffer is fully determined once a second partition enters into the same data band. In the instant case, this determination was made the moment Partition 0 was extended into the final data band (DB3) where Partition 1 resided. More specifically, once Partition 0 started writing into DB3 starting at wrap 52 and spiraling in (i.e., wraps 53, wrap 54, etc.), then the two wraps which have to be set aside as buffer are the two wraps preceding the first of the new partition (i.e., wraps 50 and 51, the two that precede wrap 52).

Consider the following exemplary implementation of lateral partitioning in a particular tape drive setting. To accomplish such an implementation, a partitioning table may be first defined, although in some embodiments a particular implementation may not create or maintain such a table, but instead retain a minimum amount of information regarding non-standard wrap progression as previously described. The table includes two rows, but for the instant implementation it is described as having three rows. A first row includes the wrap range allowed for Partition 1, including the majority of the stored data. A second row includes the wrap range allowed for Partition 0, constituting a smaller size for directory information/metadata about Partition 1. Finally, a third row includes the wrap range not presently assigned to either Partition 1 or Partition 0. Each row includes at least four columns. The first two columns describe the wrap range of a first serpentine. The second two columns describe the wrap range of a second serpentine (if any) to be traversed after the first.

Figure 4:
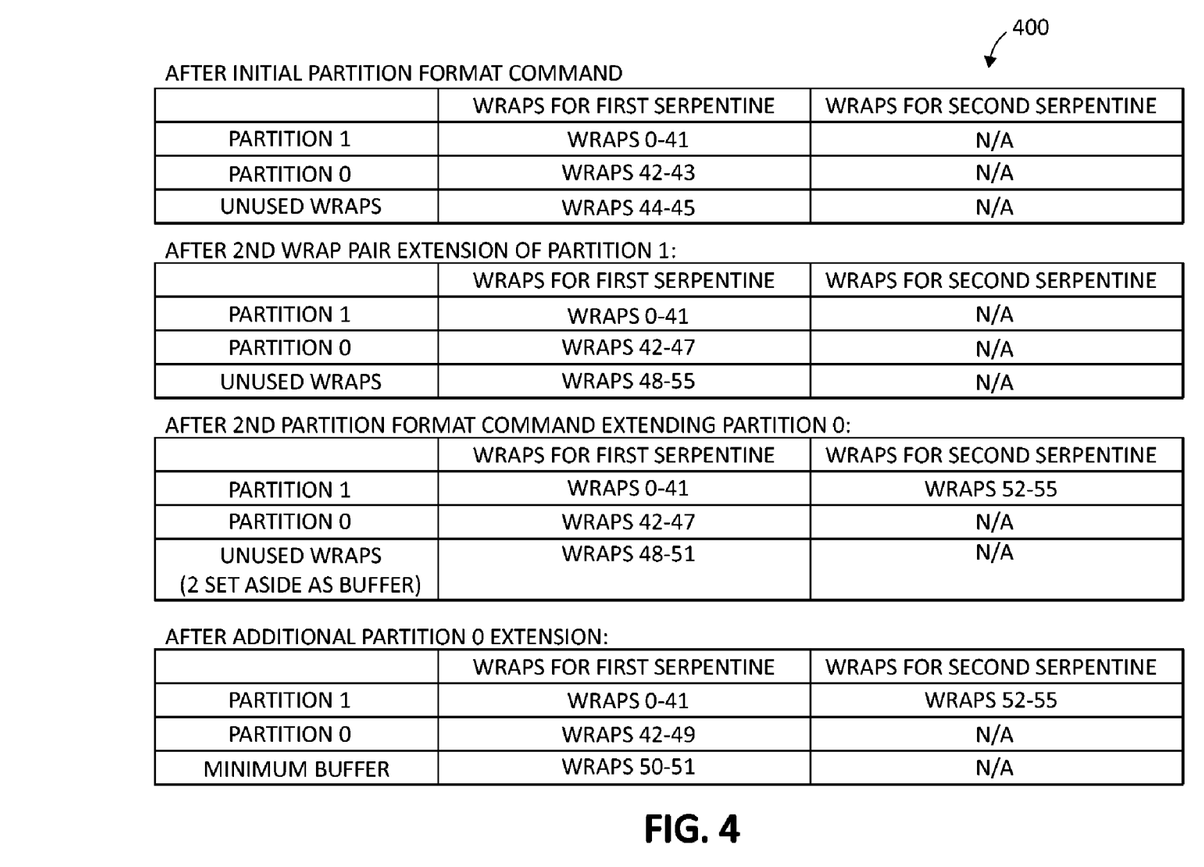
FIG. 4 is a table of an exemplary partitioning table.

A table 400 depicting such an exemplary partitioning table for an LTO-4 format is depicted in FIG. 4, following. After initial partition format, Partition 1 is assigned wraps 0-41 for the first serpentine, while Partition 0 is assigned wraps 42 and 43, leaving wraps 42-55 as unused. After the second wrap pair extension of Partition 0, it is seen that Partition 0 is now assigned wraps 42-47 (including the additional two wrap pair), leaving wraps 48-55 as unused. Later in time, following a second partition format command extending Partition 1 (as similarly described in Method 300, FIG. 3), Partition 1 is seen to include wraps 0-41 in the first serpentine, and now wraps 52-55 in the second serpentine, with wraps 48-51 as unused, and two wraps set aside as buffer. Finally, following additional extension in Partition 0, wraps 48 and 49 are assigned, leaving the minimum buffer of wraps 50-51 remaining.

The skilled artisan will appreciate that, in the case of additional embodiments, such as an instance of Partition 0 growing into an additional data band, the Partition 0 may also have a second serpentine; or that if Partition 0 grows into an additional, third data band, a third serpentine column would then be necessitated. The partitioning table 400 may be stored in at least two locations: in Cartridge Memory (CM), and an additional location on tape in the event that CM fails. In one embodiment, the information may be written in the Housekeeping Data Set (DS) area.

Figure 5:
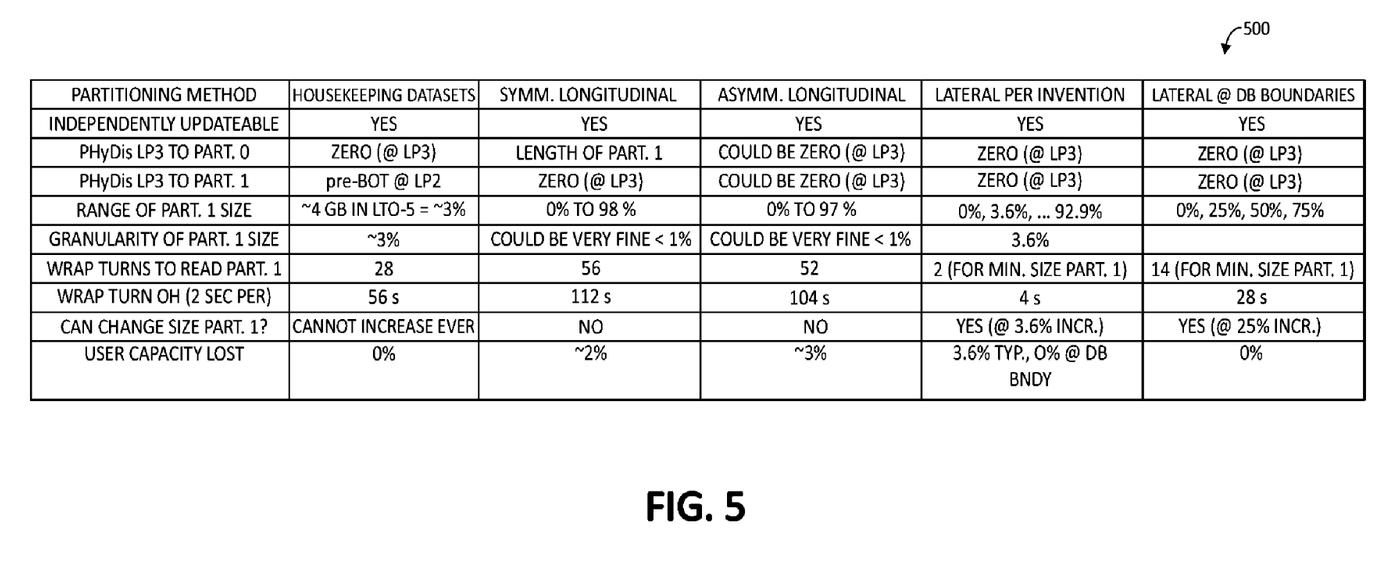
FIG. 5 is a table of exemplary partitioning implementations, including a lateral partitioning technique including various aspects of the present invention.

Advantages of the partitioning method 300 described in FIG. 3, previously, and the partitioning table 400 described above are depicted in Table 500 in FIG. 5, following. Various partitioning methods are depicted in the shown columns, such as using the Housekeeping DS area only, straight longitudinal partitioning, asymmetric longitudinal partitioning, lateral partitioning as described by the illustrated embodiments of the present invention, and lateral partitioning at data band boundaries. The skilled artisan will appreciate that the illustrated embodiments present a variety of advantages, such as the ability for the partitioning to be adaptively increased in size while achieving minimal loss of tape capacity.

FIGS. 6A-6D, following, graphically illustrate various steps in an exemplary shingled write process as described above. Note that in FIGS. 6A-6D, hashing is used as shading to assist the reader in understanding the direction a given wrap was written in. The hashing does not imply any azimuthal angle between the write gap and a lateral line across tape (i.e. perpendicular to the longitudinal motion of the tape), and neither does it in any way preclude such an angle. Beginning with FIG. 6A, an exemplary portion of tape (Data Band 0) is shown with six wraps. A first track of data 604 is written as wrap 1, consuming the written track width as shown by 602. Arrows 606, in turn, depict an intended residual track width as will be later seen. Moving to FIG. 6B, a second track 612 of data is now written as wrap 2. Here again, a written track width 610 is shown, along with an intended residual track width 608.

Figure 6A:
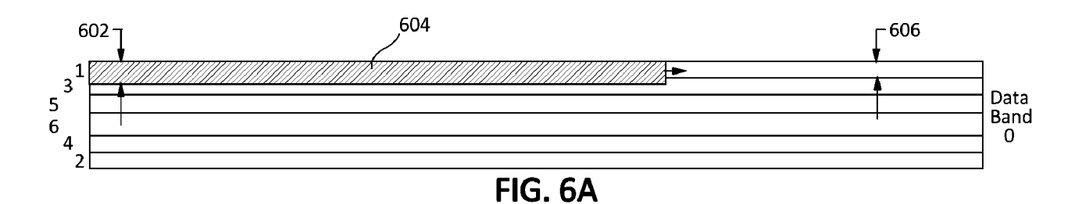
FIGS. 6A-6D are block diagrams of various exemplary steps of a shingled-write technique.
Figure 6B:
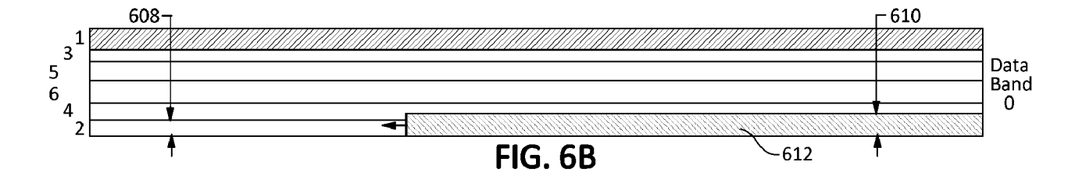
Figure 6C:
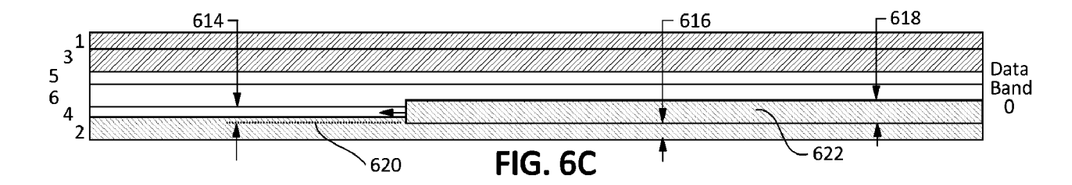
Figure 6D:
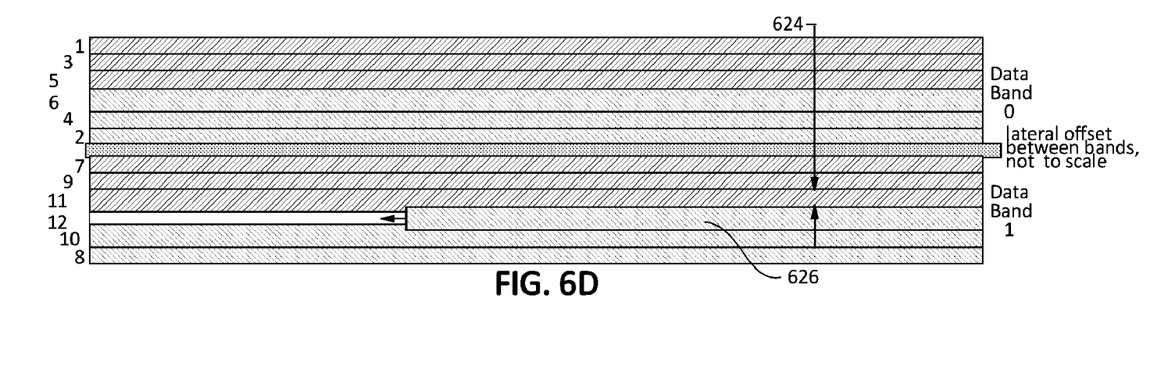

The shingling process is now seen in FIG. 6C, as the fourth track 622 (having written track width 618) is written along dotted line 620 representing one boundary of the actual residual track width 616, and corresponding with the intended residual track 622 width 614. Finally, turning to FIG. 6D, a larger portion of the tape is depicted, showing both Data Bands 0 and 1, with an accompanying boundary not drawn to scale. FIG. 6D depicts writing a 12$^{th}$ track 626 as wrap 12, which is shingled written over a portion of wraps 11 and 10 as shown, leaving, for example, wrap 11 having an actual residual track width 624 as shown.

Figure 7A:
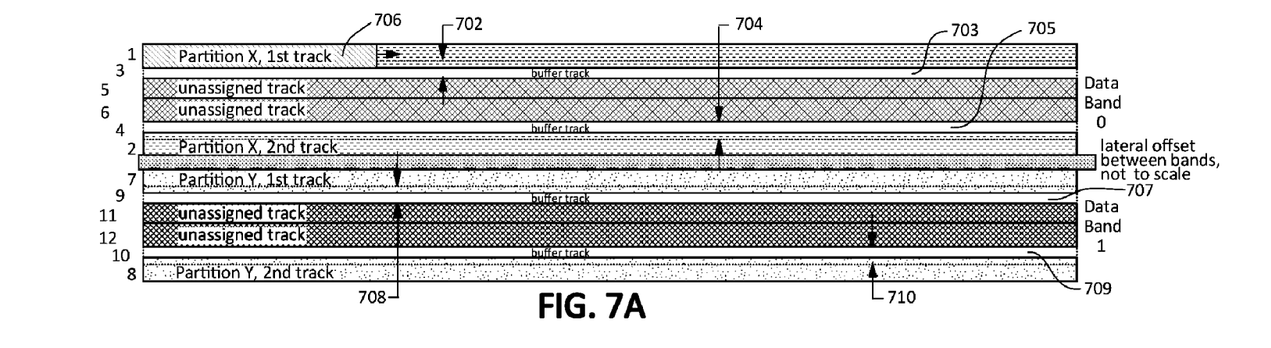
FIGS. 7A-7E are block diagrams of various exemplary steps of lateral partitioning in a shingled-write tape format.

Turning now to FIGS. 7A-7E, following, various steps in exemplary methods for performing dynamic lateral partitioning in shingled write formats are depicted. In the following illustrated embodiments, again a portion of tape having two data bands (Data Band 0 and Data Band 1) is shown, including a lateral offset boundary between bands again not drawn to scale. Turning first to FIG. 7A, the partitioning technique begins with writing the first track 706 of Partition X as is shown. Buffer track 702 (wrap 2) and buffer track 704 (wrap 4) are shown, along with buffer tracks 708 and 710 corresponding to Partition Y (wraps 9 and 10).

Figure 7B:
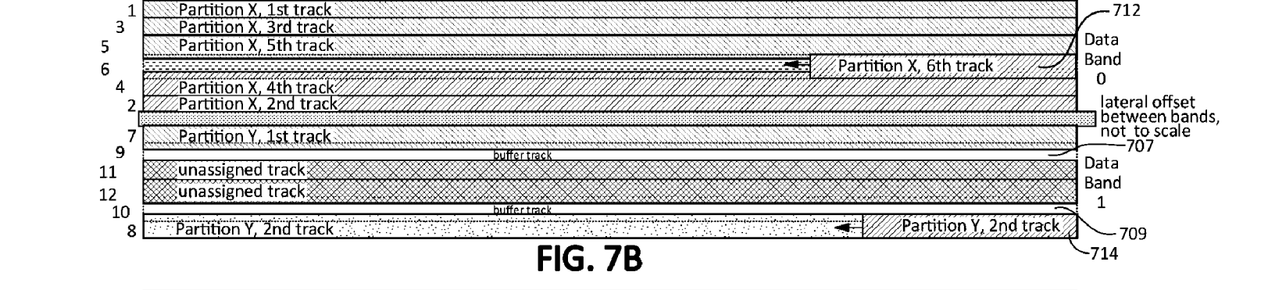

Turning now to FIG. 7B, an exemplary scenario of writing of a sixth track 712 of Partition X is shown, along with the writing of the second track 714 of Partition Y. Note that tape drives typically only have one write head. Accordingly, one of the two partitions is being actively written at any one time, and the position shown in the additional partition indicates where write (append) operations would resume in that partition when it becomes the one to be actively written.

Figure 7C:
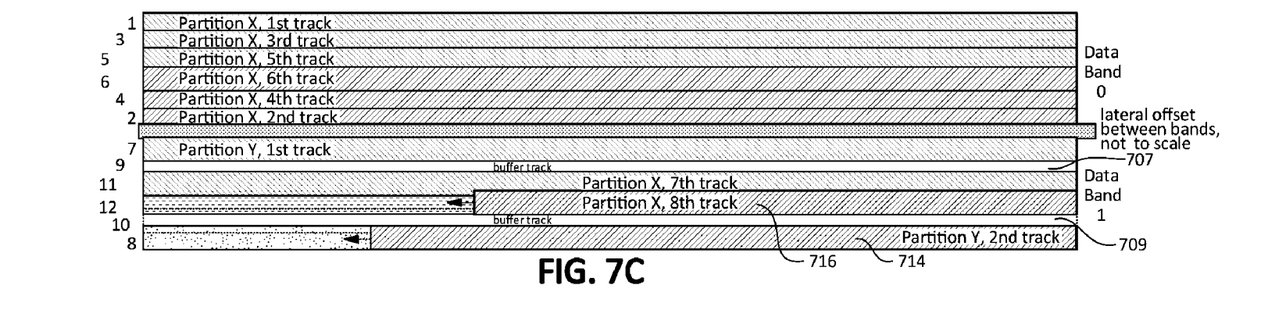

In the depicted point in time, the buffer tracks 703 and 705 (FIG. 7A) are no longer needed, as the shingled writes have now consumed the available space in the Data Band 0, and the partitions meet at the data band lateral offset boundary. However, buffer tracks 707 and 709 are retained in Data Band 1 in the event that Partition X writes must be expanded into this data band. This scenario is shown in FIG. 7C, following, where the $8^{th}$ track 716 of Partition X is depicted. Here, the seventh and eighth track of the Partition X have been written in Data Band 1, where buffer tracks 707 and 709 provide buffers between these tracks and the tracks in Partition Y, such as the second track 714 of Partition Y shown being written.

Figure 7D:
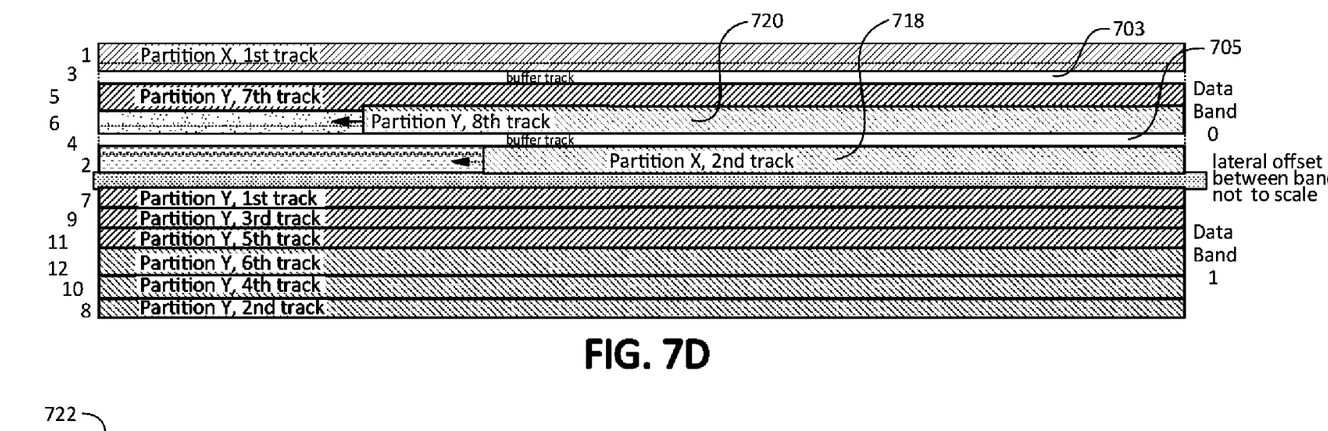
Figure 7E:
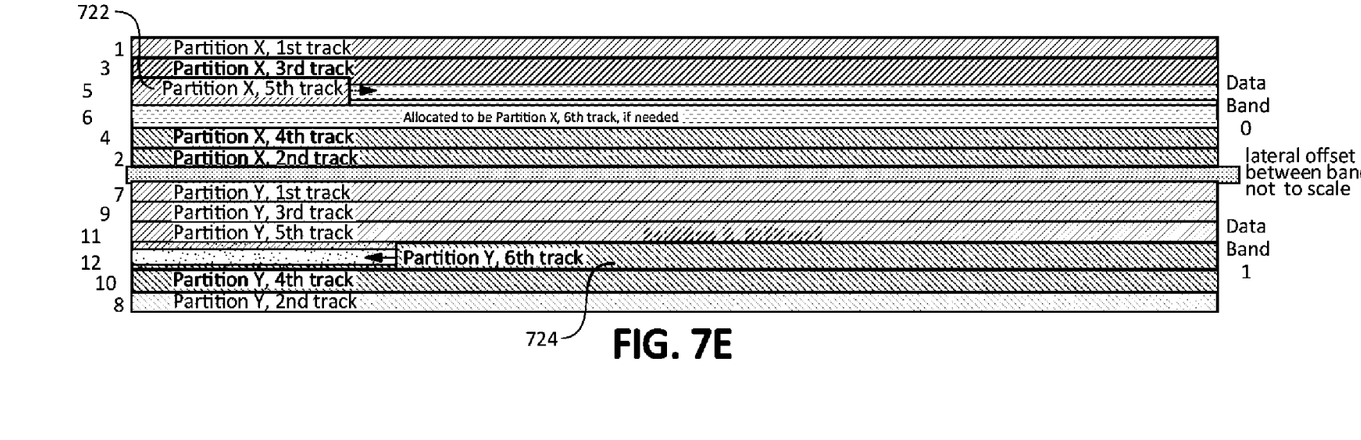

Turning now to FIG. 7D, an additional exemplary scenario is presented where the various tracks in Partition Y have consumed the available space in Data Band 1, and the $8^{th}$ track 720 of Partition Y is now written in the Data Band 0 between the buffer tracks 703 and 705 while the second track 718 of Partition X is written as shown. A final scenario is presented in FIG. 7E, following, where the sixth track 724 of Partition Y (wrap 12) is written in Data Band 1, while the fifth track 722 of Partition X (wrap 5) is written in Data Band 0. Note, the wrap 6 is allocated to be the sixth track of Partition X if needed, and the lateral offset boundary becomes the buffer between partitions as all available space is consumed.

Throughout this description, the term "shingling" is used generically to define a mechanism whereby one track is written over a portion of another track. In some embodiments, the amount of this overlap may impact the number of buffer tracks required. In the LTO format, shingling is typically performed such that the written track width is less than twice the size of the residual track width. Accordingly, the number of tracks on tape are increased by less than a factor of two. So long as one performs shingling such that residual track width of the track being overwritten is more than half of the write track width, only two buffer tracks between partitions are needed (taking the assumption that wraps are allocated to particular partitions in pairs).

In some embodiments, one wrap may be allocated at any one time to a particular partition, although such an implementation may not be ideal as a result of latencies that are caused by the partition ending at a far end of the tape. While spiral-in shingling is implemented in conjunction with the illustrated embodiments per the LTO-4 format, the skilled artisan will appreciate that other tape formats may implement spiral-out shingling techniques in conjunction with the illustrated embodiments.

The skilled artisan will appreciate that alternative embodiments to the illustrated embodiments are contemplated. One alternative embodiment may incorporate the use of additional partitions contained in a single data band. For example, in a two-partition pair per data band implementation (correlating to 8 total partitions pursuant to an LTO-4 format), including fourteen wraps per data band, a minimum of a wrap pair per partition may be assigned such that four partitions may be realized in a single data band. Such an implementation may take the exemplary form as follows:

<buffer 0>=wraps 2 and 3
Partition 1=wraps 4 and 5
<buffer 1>=wraps 6 and 7
Partition 2=wraps 8 and 9
<buffer 2>=wraps 10 and 11
Partition 3=wraps 12 and 13

Such an implementation would allow for a total of sixteen partitions per LTO-4 tape. To take the foregoing example further, an additional implementation may add additional partitions per data band if a minimum granularity assigned to a particular partition is a single wrap. For example, such an implementation may take the exemplary form as follows:

Partition 0=wrap 0 (tape outbound from cartridge)
Partition 1=wrap 1 (tape inbound to cartridge)
<buffer 0>=wrap 2 (tape outbound)
<buffer 1>=wrap 3 (tape inbound)
Partition 2=wrap 4 (tape outbound)
Partition 3=wrap 5 (tape inbound)
<buffer 2>=wrap 6 (tape outbound)
<buffer 3>=wrap 7 (tape inbound)
Partition 4=wrap 8 (tape outbound)
Partition 5=wrap 9 (tape inbound)
<buffer 4>=wrap 10 (tape outbound)
<buffer 5>=wrap 11 (tape inbound)
Partition 6=wrap 12 (tape outbound)
Partition 7=wrap 13 (tape inbound)

In this case, to address lengthier access times to the start of the partitions, partitioning may be performed before any writing occurs. For example, consider an unpartitioned LTO-4 tape loaded and written to, but less than approximately 75% capacity. In this case, all data is written in data bands 0, 1, and 2. Consider a partitioning command sent to the drive which partitions the tape into two partitions in a similar manner to method 300 (FIG. 3) described earlier. In this scenario, the command is honored, partitioning the LTO-4 tape that has been partially filled. Such a scenario is made possible if the cartridge is sufficiently empty (allowing for additional use of wraps beyond the minimal allocation of a wrap pair for buffer use).

While the methodologies and techniques described herein have been implemented in some cases in conjunction with the exemplary data storage operation previously described in FIG. 3, where metadata about a first partition of user data is written to an additional partition, the methodologies and techniques may be applicable to several other possible data storage operations. These operations include storing data pursuant to a drive file system model where one of the partitions is used to store the equivalent of a file allocation table (FAT), and data storage operations pursuant to a so-called "ping-pong" model, where an owning application may write an amount of data to a first partition, and write additional data to an additional partition, returning to write additional data to the first partition, and so forth. In ping-pong implementations, fully automated allocation of additional wraps (i.e., without any additional partitioning commands being sent) may be preferable.

Figure 8:
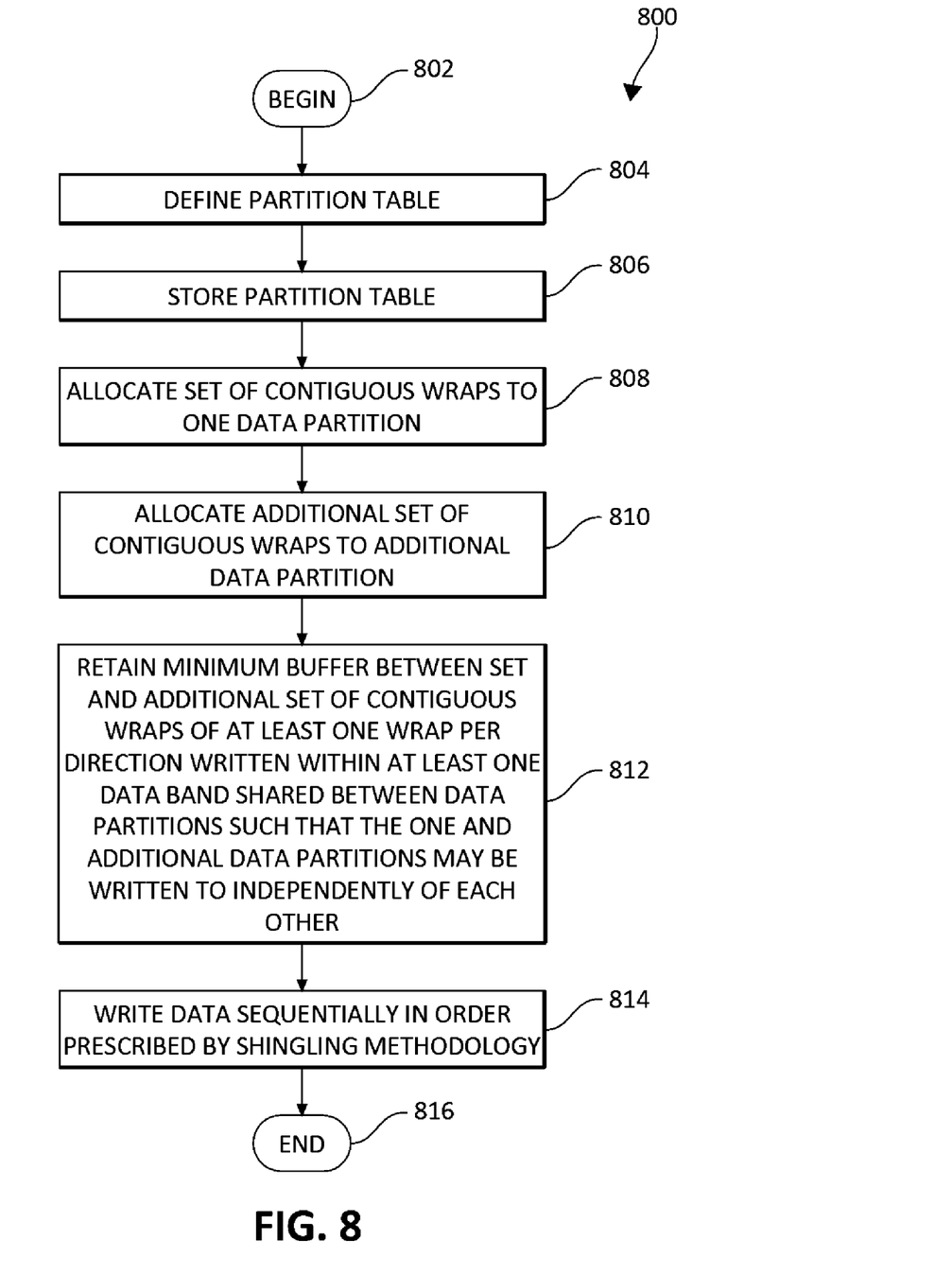
FIG. 8 is a flow chart diagram of an exemplary method for lateral partitioning for a shingled tape format, according to the present invention.

Turning now to FIG. 8, an exemplary method 800 for writing data in a tape medium having wraps by a tape drive is illustrated, according to the mechanisms of the present invention. In the method 800, following, the tape drive finds it necessary to allocate the wraps in a given shingled data band between two or more data partitions. Method 800 begins (step 802) by defining a partition table as previously described (step 804). The partition table is stored, such as in the tape medium itself or in cartridge memory (CM) (step 806).

As a following step, a first set of contiguous wraps is allocated to one data partition (step 808). Subsequently, an additional set of contiguous wraps is allocated to an additional data partition (step 810). Pursuant to such allocations, a minimum buffer area is retained between the set and the additional set of contiguous wraps of at least one wrap per direction written within at least one data band shared between the one and the additional data partitions. The minimum buffer is retained such that the one and the additional data partitions may be written to independently of each other (step 812). As a following step, data is then written to the sets of contiguous wraps sequentially pursuant to an order prescribed by a shingling methodology (such as the spiral-in, outermost to innermost technique) (step 814). The method 800 then ends (step 816).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for writing data in a tape medium having wraps by a tape drive including a controller adaptive for performing read/write operations, the tape drive allocating the wraps in shingled data bands between two or more data partitions, the method comprising:
   allocating a set of contiguous wraps to one data partition of the two or more data partitions;
   allocating an additional set of contiguous wraps to an additional data partition of the two or more data partitions; and
   retaining a minimum buffer between the set and the additional set of contiguous wraps of at least one wrap per direction written within at least one data band shared between the one and additional data partitions of the two or more data partitions such that the one and the additional data partitions may be written to by the tape drive independently of each other.

2. The method of claim 1, wherein each of the set and the additional set of contiguous wraps are written sequentially in an order prescribed by a shingling methodology.

3. The method of claim 2, wherein the shingling methodology is a spiral-in shingling methodology, and the set and the additional set of contiguous wraps are written sequentially from an outermost wrap to an innermost wrap.

4. The method of claim 3, wherein at least one of the set and the additional set of contiguous wraps inward from the outermost wrap remain unassigned until allocated by the controller to the one or the additional data partitions.

5. The method of claim 1, wherein each of the two or more data partitions spans an integer number of additional data bands positioned before or after the at least one data band shared between the one and the additional data partitions.

6. The method of claim 1, further including defining a partition table for the data attributable to the one and the additional data partitions.

7. The method of claim 6, further including storing the partition table in at least one of a cartridge memory (CM) and the tape medium.

8. A system for writing data in a tape medium having wraps by a tape drive, the tape drive allocating the wraps in shingled data bands between two or more data partitions, comprising:
   a controller capable of controlling read/write operations with respect to the tape medium and performing operations, the operations including:
      allocating a set of contiguous wraps to one data partition of the two or more data partitions,
      allocating an additional set of contiguous wraps to an additional data partition of the two or more data partitions, and
      retaining a minimum buffer between the set and the additional set of contiguous wraps of at least one wrap per direction written within at least one data band shared between the one and additional data partitions of the two or more data partitions such that the one and the additional data partitions may be written to by the tape drive independently of each other.

9. The system of claim 8, wherein the wherein the operations further include writing each of the set and the additional set of contiguous wraps sequentially in an order prescribed by a shingling methodology.

10. The system of claim 9, wherein the shingling methodology is a spiral-in shingling methodology, and the set and the additional set of contiguous wraps are written sequentially from an outermost wrap to an innermost wrap.

11. The system of claim 10, wherein at least one of the set and the additional set of contiguous wraps inward from the outermost wrap remain unassigned until allocated by the controller to the one or the additional data partitions.

12. The system of claim 8, wherein each of the two or more data partitions spans an integer number of additional data bands positioned before or after the at least one data band shared between the one and the additional data partitions.

13. The system of claim 8, wherein the operations further include defining a partition table for the data attributable to the one and the additional data partitions.

14. The system of claim 13, wherein the operations further include storing the partition table in at least one of a cartridge memory (CM) and the tape medium.

15. The system of claim 8, wherein the tape medium conforms to a Linear Tape Open (LTO) format.

16. A computer program product for writing data in a tape medium having wraps by a tape drive, the tape drive allocating the wraps in shingled data bands between two or more data partitions, the computer program product comprising a non-transitory computer-readable storage medium having computer-readable program code portions stored therein, the computer-readable program code portions comprising:
   a first executable portion for allocating a set of contiguous wraps to one data partition of the two or more data partitions;
   a second executable portion for allocating an additional set of contiguous wraps to an additional data partition of the two or more data partitions; and
   a third executable portion for retaining a minimum buffer between the set and the additional set of contiguous wraps of at least one wrap per direction written within at least one data band shared between the one and additional data partitions of the two or more data partitions such that the one and the additional data partitions may be written to by the tape drive independently of each other.

17. The computer program product of claim 16, further including a fourth executable portion for writing each of the set and the additional set of contiguous wraps sequentially in an order prescribed by a shingling methodology.

18. The computer program product of claim 16, further including a fourth executable portion for defining a partition table for the data attributable to the one and the additional data partitions.

19. The computer program product of claim 18, further including a fifth executable portion for storing the partition table in at least one of a cartridge memory (CM) and the tape medium.

20. A method for manufacturing a system for writing data in a tape medium having wraps by a tape drive, the tape drive allocating the wraps in shingled data bands between two or more data partitions, comprising:
   providing a controller capable of controlling read/write operations with respect to the tape medium and performing operations, the operations including:
      allocating a set of contiguous wraps to one data partition of the two or more data partitions,
      allocating an additional set of contiguous wraps to an additional data partition of the two or more data partitions, and
      retaining a minimum buffer between the set and the additional set of contiguous wraps of at least one wrap per direction written within at least one data band shared between the one and additional data partitions of the two or more data partitions such that the one and the additional data partitions may be written to by the tape drive independently of each other.

21. The method of manufacture of claim 20, wherein the operations further include writing each of the set and the additional set of contiguous wraps sequentially in an order prescribed by a shingling methodology.

22. The method of manufacture of claim 21, wherein the shingling methodology is a spiral-in shingling methodology, and the set and the additional set of contiguous wraps are written sequentially from an outermost wrap to an innermost wrap.

23. The method of manufacture of claim 20, wherein each of the two or more data partitions spans an integer number of additional data bands positioned before or after the at least one data band shared between the one and the additional data partitions.

24. The method of manufacture of claim 20, wherein the operations further include defining a partition table for the data attributable to the one and the additional data partitions.

25. The method of manufacture of claim 24, wherein the operations further include storing the partition table in at least one of a cartridge memory (CM) and the tape medium.

* * * * *